US007769484B2

(12) United States Patent
Senda et al.

(10) Patent No.: US 7,769,484 B2
(45) Date of Patent: Aug. 3, 2010

(54) SETUP INFORMATION GENERATING DEVICE AND METHOD FOR PUNCH PRESS

(75) Inventors: Takashi Senda, Inuyama (JP); Makoto Totsugi, Inuyama (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 878 days.

(21) Appl. No.: 11/650,458

(22) Filed: Jan. 8, 2007

(65) Prior Publication Data

US 2007/0163414 A1 Jul. 19, 2007

(30) Foreign Application Priority Data

Jan. 13, 2006 (JP) ............................ 2006-005577

(51) Int. Cl.
*B23Q 3/155* (2006.01)
*G06F 19/00* (2006.01)

(52) U.S. Cl. ....................... 700/179; 700/180; 700/160; 700/206; 700/100; 483/1; 483/29; 483/5; 483/8; 83/552

(58) Field of Classification Search ..................... 483/1, 483/28–29, 4–5, 7, 11; 83/552, 549; 72/446, 72/448; 700/179, 180–182, 160, 165, 206, 700/100, 97

See application file for complete search history.

(56) References Cited

U.S. PATENT DOCUMENTS 5,478,301 A * 12/1995 Takahashi .................... 483/11

(Continued)

FOREIGN PATENT DOCUMENTS

JP 04-182038 A * 6/1992

(Continued)

OTHER PUBLICATIONS

Machine Translation of JP-2003-091307, which Japanese patent document published in Mar. 2003.*

*Primary Examiner*—Erica E Cadugan
(74) *Attorney, Agent, or Firm*—Westerman, Hattori, Daniels & Adrian, LLP

(57) ABSTRACT

A setup information generating device for a punch press which can generate setup information on replacement of a punch and a die with compatible tools, that is, replacement among punches and dies identified by the same tool number and used for processing for the same shape and the same size and which can also generate setup information according to processing know-how or the like. The device has a setup information generating device 48 for comparing a processing schedule with tool numbers in a mounted tool information storage device 45 to generate setup information. The device has a compatible tool registering device 38 for registering processing conditions such as material quality and board thickness and information on which of plural types of punches $\mathbf{8}_1$ and dies $\mathbf{8}_2$ identified by the same tool number are compatible as a punch $\mathbf{8}_1$ and a die $\mathbf{8}_2$ which meet the processing conditions are registered in accordance with inputs from an operation panel 46. In addition to performing the comparison of the tool numbers, the setup information generating device 48 checks the processing conditions contained in the processing schedule against the compatible tool registering device 38, and compares the obtained compatibility numbers of the compatible punch $\mathbf{8}_1$, and die $\mathbf{8}_2$ with the compatibility numbers stored in the mounted tool information storage device 45.

4 Claims, 10 Drawing Sheets

U.S. PATENT DOCUMENTS

| | | | | |
|---|---|---|---|---|
| 5,943,240 | A * | 8/1999 | Nakamura | 483/8 |
| 6,163,734 | A * | 12/2000 | Shigefuji et al. | 483/9 |
| 6,344,018 | B1 * | 2/2002 | Aizawa | 483/29 |
| 7,324,869 | B2 * | 1/2008 | Senda et al. | 700/179 |
| 7,460,928 | B2 * | 12/2008 | Senda et al. | 700/179 |

FOREIGN PATENT DOCUMENTS

| | | |
|---|---|---|
| JP | 2003-91307 A | 3/2003 |

* cited by examiner 82
47a
47
Immediate
Next row or second row from current row
Next row or second row from current row
84 83 85 86
64
61
63
62
54
59
51
50
55

82
81
6
Immediate
1
Next row or second row from current row
2
Next row or second row from current row
4
83
84
85
86
Adapt
Cancel
T St Mold display Upper mold Lower mold
6 1 1 1
6 2 10-10 1 1
6 3 1 1
6 4 1 1
6 5 1 1
6 6 1 1
6 7 0 0
6 8 0 0
T St Number Mold display Upper mold Lower mold
6 4 253 1 1
6 6 375 1 2
81a
81b
87
87

SETUP INFORMATION GENERATING DEVICE AND METHOD FOR PUNCH PRESS

FIELD OF THE INVENTION

The present invention relates to a setup information generating device and method for a punch press which generates information on a setup operation involving replacement of tools such as punches and dies.

BACKGROUND OF THE INVENTION

Punching is carried out using a set of a punch and a die. However, the clearance between the punch and the die may be inappropriate for a different board thickness or material quality, resulting in the occurrence of burrs or the like. This prevents high quality processing. Thus, for punches and dies identified by the same tool number and used for processing for the same shape and the same size, plural types of dies may be prepared which have punch fitting portions of different diameters so that any of the dies, which is to be combined with the appropriate punch, can be replaced according to board thickness, material quality, or the like. Plural types of punches may be prepared which differ in, instead of clearance, shear angle or the presence of a corner chamfer shape around the periphery of a leading end so as to allow a change of combination of a punch and a die. Punches having rubber and metal strippers may be prepared so that a punch with a compatible stripper can be selected according to the quality of the material. Operators normally appropriately manage such a combination of a punch and a die at the site.

The conventional operation and management of combination of a punch and a die depends on the operators' experiences at the site. This may prevent appropriate management. For example, the operator may forget to carry out required setup, resulting in erroneous processing. Further, during a scheduled continuous operation, the combination of a punch and a die cannot be managed in terms of the clearance between the punch and die, and tuning and inspections based on know-how.

An object of the present invention is to provide a setup information generating device and method for a punch press which can generate setup information not only on replacement of a punch and a die with those having a different tool number but also on replacement of a punch and a die with compatible tools, that is, replacement among punches and dies identified by the same tool number and used for processing for the same shape and the same size, the setup information generating device also being able to generate setup information according to processing know-how or the like. Another object of the present invention is to allow an operator to easily perform an input operation for registering the associations between processing conditions such as board thickness and material quality and compatible tools. Yet another object of the present invention is, in particular, to enable the generation of information on a setup operation for changing clearance.

SUMMARY OF THE INVENTION

The present invention provides a setup information generating device for a punch press 1 in which a plurality of punches $\mathbf{8}_1$ and a plurality of dies $\mathbf{8}_2$ can be mounted with replacement punches $\mathbf{8}_1$ and dies $\mathbf{8}_2$ prepared and for which for any of the mounted or prepared punches $\mathbf{8}_1$ and dies $\mathbf{8}_2$, replacement among plural types of punches $\mathbf{8}_1$ or dies $\mathbf{8}_2$ is possible for at least either the punches $\mathbf{8}_1$ or dies $\mathbf{8}_2$ identified by the same tool number and used for processing for the same shape and the same size, the setup information generating device generating setup information F3 on replacement of the punches $\mathbf{8}_1$ and dies $\mathbf{8}_2$ and comprising the following constitutions. That is, the setup information generating device comprises processing schedule storage means 44 that stores a processing schedule SH including information on tool numbers of the punch $\mathbf{8}_1$ and die $\mathbf{8}_2$ required for processing, mounted tool information storage means 45 that stores the tool numbers of the punches $\mathbf{8}_1$ and dies $\mathbf{8}_2$ mounted on the punch press 1, setup information generating means 48 for comparing the tool numbers stored in the processing schedule storage means 44 with the tool numbers stored in the mounted tool information storage means 45 to generate setup information F3, and compatible tool registering means 38 in which processing conditions such as the material quality and board thickness of a plate material W to be processed and information on which of the plural types of punches $\mathbf{8}_1$ and dies $\mathbf{8}_2$ identified by the same tool number are compatible as a punch $\mathbf{8}_1$ and a die $\mathbf{8}_2$ which meet the processing conditions are registered in accordance with inputs from input means 46. The mounted tool information storage means 45 stores, in addition to the tool numbers, compatibility numbers that identify the plural types of punches $\mathbf{8}_1$ and dies $\mathbf{8}_2$ identified by the same tool number. The processing schedule SH contains the processing conditions. In addition to performing the comparison of the tool numbers, the setup information generating means 48 checks the processing conditions contained in the processing schedule SH against the compatible tool registering means 38, and compares the obtained compatibility numbers of the compatible punch and die with the compatibility numbers stored in the mounted tool information storage means 45 to generate setup information F3.

With this configuration, in addition to performing the comparison of the tool numbers, the setup information generating means 48 checks the processing conditions such as the board thickness and material quality which are contained in the processing schedule SH against the contents registered in the compatible tool registering means 38, and compares the obtained compatibility numbers of the compatible punch and die with the compatibility numbers stored in the mounted tool information storage means 45 to generate setup information F3. This prevents the situation in which required setup fails to be executed, resulting in erroneous processing. Further, the following are registered in the compatible tool registering means 38 in accordance with inputs from the input means 46: processing conditions such as the material quality and board thickness of the plate material and information on which of the plural types of punches $\mathbf{8}_1$ and dies $\mathbf{8}_2$ identified by the same tool number are compatible as the punch $\mathbf{8}_1$ and die $\mathbf{8}_2$ which meet the processing conditions. This enables processing know-how or the like to be reflected by the registration in the compatible tool registering means 38, resulting in appropriate processing.

In the present invention, the compatible tool registering means 38 may have a menu that allows a plurality of selection contents to be displayed for each of items of the processing conditions such as material quality and board thickness, and the compatibility numbers, and may have a selection input function for allowing selections from the menu. Thus providing the menu display for selections facilitates the input of the processing conditions and compatibility numbers.

In the present invention, the plural types of punches $\mathbf{8}_1$ or dies $\mathbf{8}_1$ identified by the same tool number and used for processing for the same shape and the same size may have different clearances between the punch $\mathbf{8}_1$ and the die $\mathbf{8}_2$. This enables the generation of information on a setup for changing the clearance, allowing the setup of combination of a punch $8_1$ and a die $8_2$ with an appropriate clearance. This enables high quality punching to be always achieved.

The present invention provides the setup information generating device for the punch press in which the plurality of punches and the plurality of dies can be mounted with the replacement punches and dies prepared and for which for any of the mounted or prepared punches and dies, replacement among plural types of punches or dies is possible for at least either the punches or dies identified by the same tool number and used for processing for the same shape and the same size, the setup information generating device generating setup information on replacement of the punches and dies, the setup information generating device comprising the processing schedule storage means that stores the processing schedule including information on the tool numbers of the punch and die required for processing, the mounted tool information storage means that stores the tool numbers of the punches and dies mounted on the punch press, the setup information generating means for comparing the tool numbers stored in the processing schedule storage means with the tool numbers stored in the mounted tool information storage means to generate setup information, and the compatible tool registering means in which the processing conditions such as the material quality and board thickness of a plate material to be processed and information on which of the plural types of punches and dies identified by the same tool number are compatible as a punch and a die which meet the processing conditions are registered in accordance with inputs from the input means, wherein the mounted tool information storage means stores, in addition to the tool numbers, the compatibility numbers that identify the plural types of punches and dies identified by the same tool number, the processing schedule contains the processing conditions, and in addition to performing the comparison of the tool numbers, the setup information generating means checks the processing conditions contained in the processing schedule against the compatible tool registering means, and compares the obtained compatibility numbers of the compatible punch and die with the compatibility numbers stored in the mounted tool information storage means to generate setup information. This enables the generation of setup information not only on replacement of a punch and a die with those having a different tool number but also on replacement of a punch and a die with compatible tools, that is, replacement among punches and dies identified by the same tool number and used for processing for the same shape and the same size. Setup information can also be generated according to processing know-how or the like.

Where the compatible tool registering means has a menu that allows a plurality of selection contents to be displayed for each of items of the processing conditions such as material quality and board thickness and the compatibility numbers, and has a selection input function for allowing selections from the menu, the operator can easily perform an input operation for registering the associations between the processing conditions such as board thickness and material quality and the compatible tools. Where the plural types of punches or dies identified by the same tool number and used for processing for the same shape and the same size have different clearances between the punch and the die, information on a setup operation for changing the clearance can be generated. This enables high quality punching to be always achieved.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
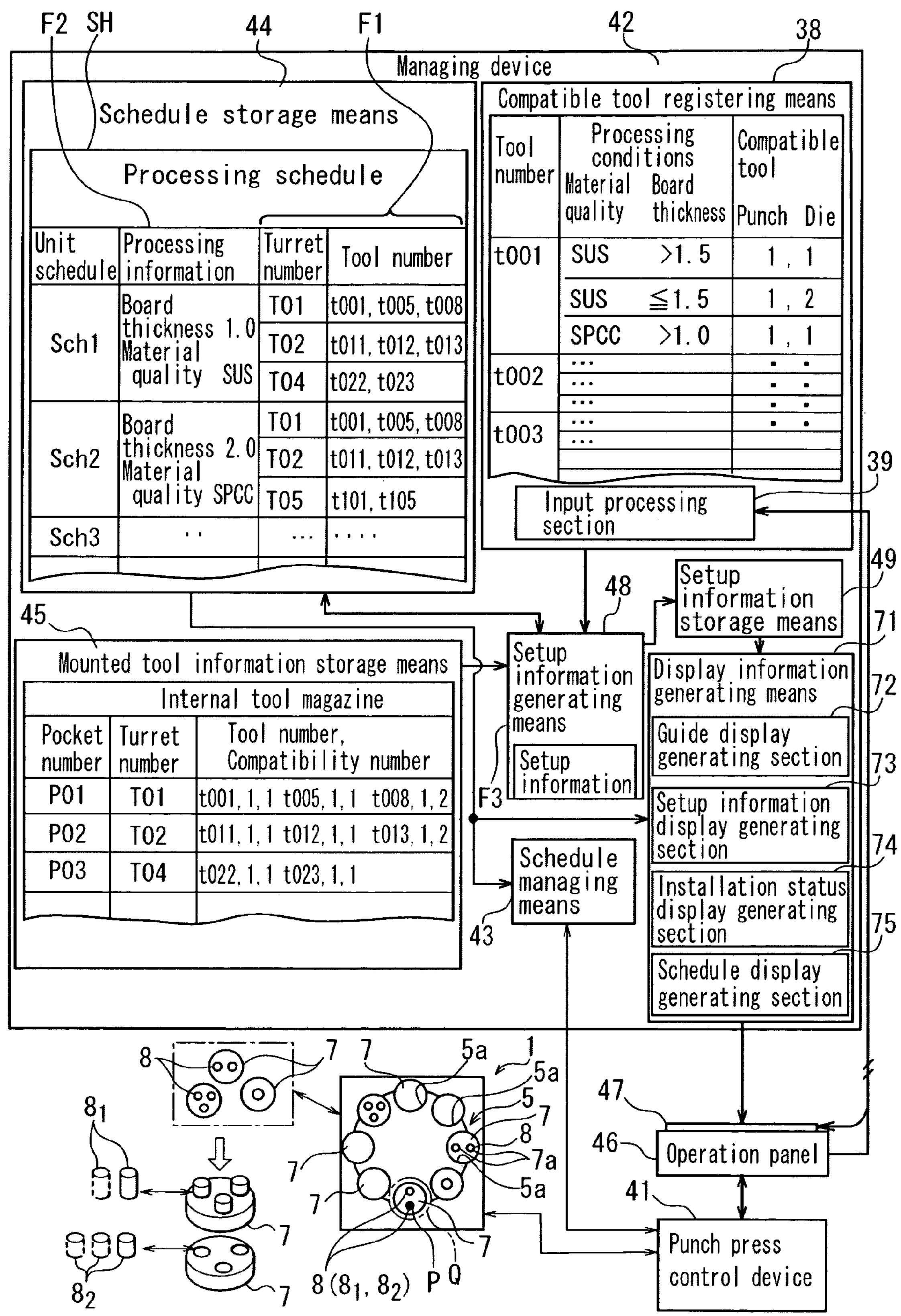
FIG. 1 is a block diagram showing the conceptual configuration of a setup information generating device for a punch press according to a first embodiment of the present invention.

A first embodiment of the present invention will be described with reference to FIGS. 1 to 9. FIG. 1 shows the conceptual configuration of a processing facility comprising a setup information generating device according to the first embodiment. The processing facility comprises a punch press 1, a punch press control device 41 that controls the punch press 1, an operation panel 46 which allows the punch press control device 41 to be operated and which allows the punch press 1 to be directly operated, and a managing device 42.

Figure 7:
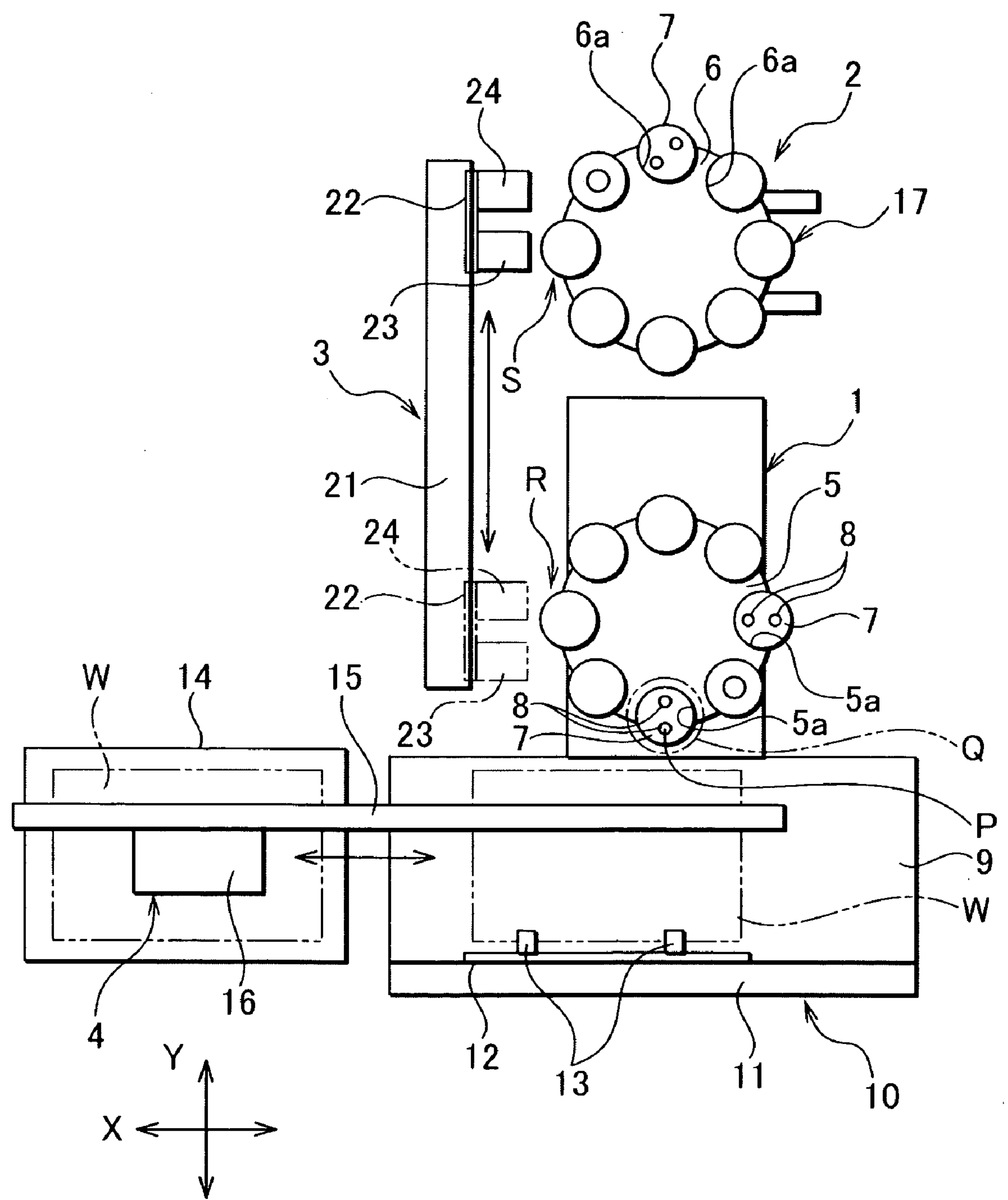
FIG. 7 is a plan view showing an example of a punch press to which the tool information generating device is applied.

The present embodiment is applied to the punch press 1 configured as follows. As shown in FIG. 7, the punch press 1 comprises a presetter 2, a tool changer 3, and a loader 4 as peripheral instruments. The presetter 2 stores tools prepared so as to be mounted in the punch press 1 for replacement for setup. The punch press 1 comprises an internal tool magazine 5 on which a plurality of turrets 7 are changeably installed; the turrets 7 are each a tool support on which tools 8 composed of punches or dies are mounted. In the present specification, when the punch and die are not particularly distinguished from each other, they are collectively called tools 8. The tool changer 3 is a device that automatically changes the turrets 7 between the internal tool magazine 5 provided in the punch press 1 and an external tool magazine 6 provided in the presetter 2, respectively.

Figure 9A:
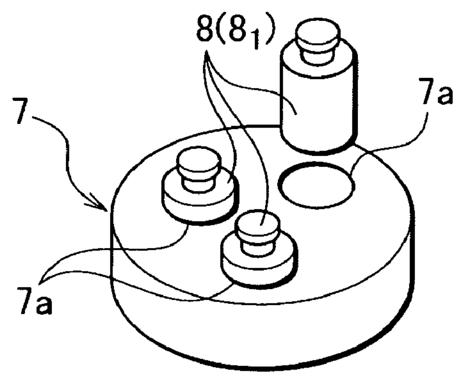
FIG. 9A is a perspective view showing turrets in the punch press.
Figure 9A:
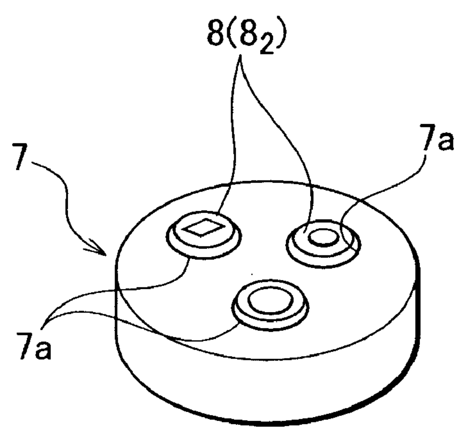

As shown in FIG. 9A, the turret 7 has a circular planar shape, and one or more tools 8 are mounted on each turret 7. Each of the tools 8 is changeably mounted in a tool supporting portion 7*a*, comprising a through-hole or the like, formed in the turret 7. The punch $\mathbf{8}_1$ and the die $\mathbf{8}_2$, as the tools $\mathbf{8}_1$ are used in a vertical pair, and each turret 7 is provided for a punch $\mathbf{8}_1$ or for a die $\mathbf{8}_2$ constituting a vertical pair.

The tools 8 vary in the shape and size of a hole to be punched, and the tools 8 intended for different punch hole shapes and sizes are mounted in the plurality of tool supporting portions 7*a*, formed in the turret 7. The tools $\mathbf{8}_1$ both the punches $\mathbf{8}_1$ and dies $\mathbf{8}_2$, which have the same processing hole shape and size are provided with the same tool number as a management number.

Figure 8:
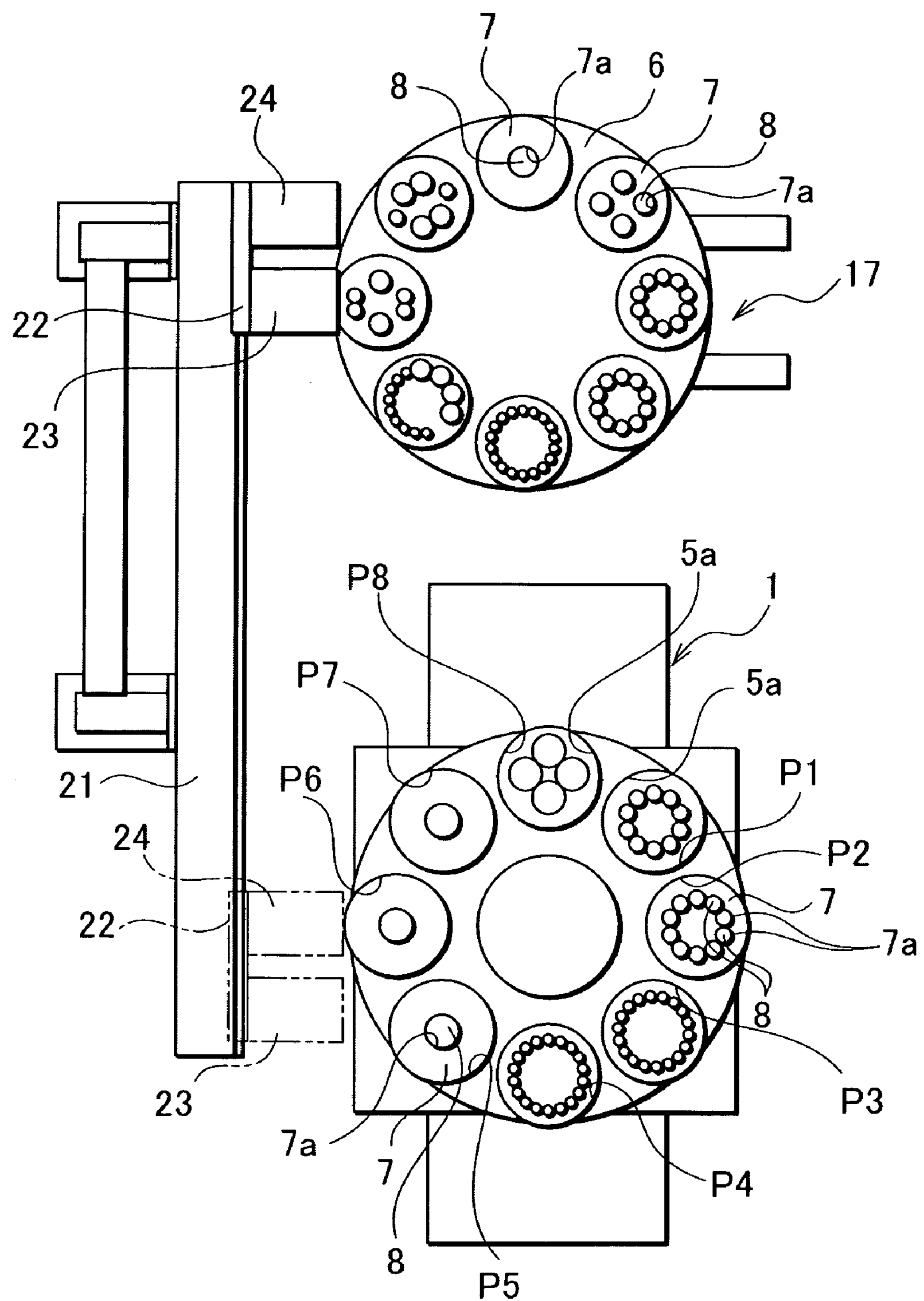
FIG. 8 is an enlarged plan view showing an internal tool magazine, an external tool magazine, and a tool changer in the punch press.

The turrets 7 are prepared a plurality of tool supporting portions 7*a* which have different numbers, different arrangement and different sizes and so on as shown in FIG. 8. Plural types of tools 8 with a compatible outer diameter dimension can be mounted in the same tool supporting portion 7*a*, and arbitrary fittable tools 8 are mounted in the tool supporting portions 7*a* of the different types of turrets 7 to organize the tools on the turrets 7.

Figure 9B:
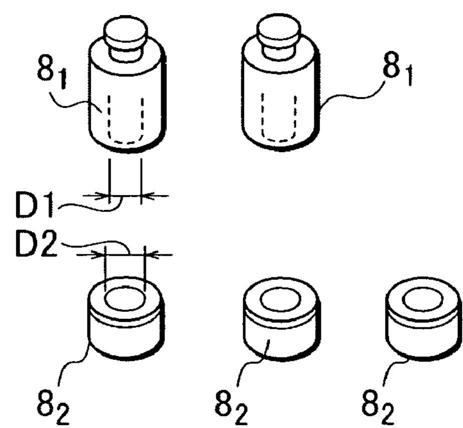
FIG. 9B is a perspective view showing punches and dies.

In FIG. 9B, the punch $\mathbf{8}_1$ and die $\mathbf{8}_2$ are manufactured so that the hole diameter $D_2$ of punch fitting hole of the die $\mathbf{8}_2$ is slightly larger than the diameter $D_1$ of die entering portion of the punch $\mathbf{8}_1$, and this difference results in a clearance between the punch $\mathbf{8}_1$ and the die $\mathbf{8}_2$. Plural types of dies $\mathbf{8}_2$ with different hole diameters $D_2$ are prepared so that even the dies $\mathbf{8}_2$ that are identified by the same tool number have different clearances. A single type of punch $\mathbf{8}_1$ may be prepared in connection with clearance adjustment. However, plural types of punches $\mathbf{8}_1$ with the same tool number are prepared which differ in shear angle, the presence of a corner chamfer shape around the periphery of a leading end, and the configuration of a stripper (not shown in the drawings; for example, strippers made of rubber or metal).

Plural types of punch $\mathbf{8}_1$ and die $\mathbf{8}_2$ with the same tool number may be prepared only for some of the punches $\mathbf{8}_1$ and dies $\mathbf{8}_2$. The remaining pairs of punches $\mathbf{8}_1$ and dies $\mathbf{8}_2$ may have respective different tool numbers.

In FIG. $\mathbf{8}_1$ the internal tool magazine 5 is rotatable in a horizontal direction, and pockets 5*a*, which removably hold the turrets 7, are arranged in an outer peripheral part of the internal tool magazine 5 at plurality of positions in a circumferential direction. The each pockets 5*a* is identified by pocket numbers P01 to P08 for control. The internal tool magazine 5 comprises a vertical pair of turrets 7 which are concentrically installed in vertical direction, and the internal tool magazine 5 holds the punch-side turrets 7 and die-side turrets 7, respectively which are synchronously rotated. The figure shows only the upper internal tool magazine 5.

In FIG. 7, the punch press 1 has a magazine indexing portion and a tool holder indexing portion (neither of them are shown in the drawings) as a tool indexing mechanism. The magazine indexing portion is a mechanism that rotates the internal tool magazine 5 so that an arbitrary pocket 5*a* on the internal tool magazine 5 aligns with a press head position Q. The tool holder indexing portion holds the turret 7 located at the press head position Q and rotates this turret 7 around the center of the tool holder, and this allows an arbitrary tool 8 on the turret 7 to be indexed to a predetermined punch position P. The tool 8 indexed to the punch position P is elevated or lowered via a ram by a punch driving source such as a servo motor; the ram can be elevated and lowered.

The punch press 1 has a plate material feeding mechanism 10 that moves a plate material W on a table 9 in two orthogonal directions (X axis and Y axis), and the plate material feeding mechanism 10 moves to move an area of the plate material W to be processed, to the punch position P. The plate material feeding mechanism 10 has a carriage 11 that moves forward and backward along the Y axis and on which a cross slide 12 is mounted so as to be movable forward and backward along the X axis. A plurality of work holders 13 are attached to the cross slide 12 to grip an end of the plate material W.

The loader 4 is a device that grips, by means of suction or the like, each of the plate materials W stacked on a predetermined plate material placing portion 14, to feed the plate material W onto the table 9 of the punch press 1. The loader 4 comprises a suction pad, which grips the plate material W, (not shown in the drawings) on a traveling member 16 that travels on an erection rail 15.

The presetter 2 is installed so that it can rotate and index the external tool magazine 6, and the presetter 2 is installed behind the punch press 1. The presetter 2 is provided with a setup changing portion 17 that allows the operator to change the turrets 7 on the external tool magazine 6. The external tool magazine 6 is rotatable in the horizontal direction similarly to the internal tool magazine 5, and pockets 6*a*, which removably hold the turrets 7, are formed in an outer peripheral part of the external tool magazine 6 at plurality of positions in a circumferential direction. The external tool magazine 6 also comprises a vertical pair of turrets 7 which are concentrically installed in the vertical direction, and the turret 7 for mounting punch tool and the turret 7 for mounting die tool are provided in the external tool magazine 6, respectively. Magazine indexing means (not shown in the drawings) carries out driving for rotation and indexation.

The tool changer 3 is a device that changes the turrets 7 between the internal tool magazine 5 on the punch press 1 and the external tool magazine 6. The turrets 7 are changed at change indexing position R on the internal tool magazine 5 and at change indexing position S on the external tool magazine 6, respectively. The tool changer 3 comprises a guide rail 21 that extends between the change indexing position R on the internal tool magazine 5 and the change indexing position S on the external tool magazine 6, and a traveling member 22 that travels along the guide rail 21. The traveling member 22 is provided with two chucks 23, 24 arranged side by side in a traveling direction to hold the respective turrets 7. One of the chucks 23, 24 holds a turret 7 to be changed. The other empty chuck 23 or 24 receives a turret 7 from the internal tool magazine 5 or external tool magazine 6, and the first chuck 24 or 23 delivers the held target turret 7 to be changed to the internal tool magazine 5 or external tool magazine 6. This enables the turrets 7 to be changed by a single traveling operation of the traveling member 22 between the internal tool magazine 5 and external tool magazine 6.

The turrets 7 can be changed by a single traveling operation where the traveling member 22 has the single chuck 23 or 24 and the turret 7 to be changed is temporarily placed on a temporary placement table (not shown in the drawings) provided near each of the change indexing positions R, S. Like the internal tool magazine 5 and external tool magazine 6, the chucks 23, 24, provided on the traveling member 22, are arranged for the turret 7 mounting the punch and for the turret 7 mounting the die, respectively, and the chucks 23, 24 are arranged side by side in the vertical direction.

A control system will be described. In FIG. 1, a punch press control device 41 (processing machine control device) is a computerized device that controls the punch press 1 and its peripheral instruments in accordance with programs. The punch press control device 41 comprises a numerical control device that controls the punch press 1, a changer control device that controls the tool changer 3, and a loader control device that controls the loader 4 (none of them are shown in the drawings).

The managing device 42 is a computer that manages schedules for scheduled operations and generates setup information. A part or the whole of the managing device 42 constitutes the processing machine control device 41 or the managing device 42 is provided independently of the processing machine control device 41. The managing device 42 has schedule storage means 44, mounted tool information storage means 45, compatible tool registering means 38, setup information creating means 48, setup information storage means 49, schedule managing means 43, and display information generating means 71. The managing device 42 may have schedule creating means (not shown in the drawings).

The schedule storage means 44 stores a processing schedule SH. The processing schedule SH gathers a plurality of unit schedules Sch (Sch1 to Schn (n is an arbitrary natural number) each containing tool information F1 and processing information F2 for processing. The unit schedule Sch is a schedule corresponding to one execution of one processing program (not shown in the drawings).

The tool information F1 contains the turret numbers (T01, T02, . . . ) of the turrets 7 for processing and information indicating which tool 8 is installed in each tool supporting portion 7*a* of the turret 7. The processing information F2 relates to the board thickness and quality of the material.

The schedule managing means 43 allows the processing machine control device 41 to execute a processing program in accordance with the processing schedule SH stored in the schedule storage means 44. The schedule managing means 43 thus manages the progress of the processing.

The mounted tool information storage means 45 stores information on the turrets 7 installed on the internal tool magazine 5 and external tool magazine 6, and information on the tools 8 mounted on the turrets 7. Specifically, the mounted tool information storage means 45 stores, for each of the pocket numbers (P01, P02, . . . ) identifying the pockets 5*a*, 6*a* on the internal tool magazine 5 and external tool magazine 6, information on the turret number (T01, T02, . . . ) of the turret 7 installed in that pocket 5*a*, 6*a*, identified by the pocket number, and information indicating which tool 8 is installed in each tool supporting portion 7*a* of the turret 7 with that turret number.

Where plural types of tools 8 are prepared for the punch $\mathbf{8}_1$ and die $\mathbf{8}_2$ identified by the same tool number and used for processing for the same shape and the same size, the mounted tool information storage means 45 also stores compatibility numbers (for example, the punches $\mathbf{8}_1$, $\mathbf{8}_2$, $\mathbf{8}_3$ are numbered 1, 2, 3, . . . ) for distinguishing the plurality of punches $\mathbf{8}_1$ from one another and the plurality of dies $\mathbf{8}_2$ from one another. In the example shown in the figure, the tool information comprises a tool number such as "t001", followed by a compatibility number "1" for the punch $\mathbf{8}_1$ corresponding to the upper tool, followed by a compatibility number "1" for the die $\mathbf{8}_2$ corresponding to the lower tool, and the like.

The pocket numbers (P01 P02, . . . ) are provided for each of the internal tool magazine 5 and external tool magazine 6. The mounted tool information storage means 45 also stores information on the turret numbers of the turrets 7 held on the tool changer 3.

Where any turret 7 installed in the internal tool magazine 5 or external tool magazine 6 has its installed position changed or is removed, the mounted tool information storage means 45 changes the storage contents automatically or in accordance with the operator's operation.

The compatible tool registering means 38 is a registering means in accordance with inputs from the input means, and the compatible tool registering means 38 register processing conditions such as the material quality and board thickness of the plate material W to be processed and information on which of the plural types of punches $\mathbf{8}_1$ and dies $\mathbf{8}_2$ identified by the same tool number are compatible as a punch $\mathbf{8}_1$ and a die $\mathbf{8}_2$ which meet the processing conditions. The input means comprises, for example, switches provided on the operation panel 46 and a touch panel. The operation panel 46 has a screen display device 47 such as a liquid crystal display device, and the screen display device 47 is covered with, for example, a touch panel (not shown in the drawings) that enables the inputting of the information at a position touched by the operator's finger.

The compatible tool registering means 38 has input processing means 39 that provides functions including a menu that allows a plurality of selection contents to be displayed for each of items of the processing conditions such as material quality and board thickness and the compatibility numbers, as well as a selection input function for allowing selections from the menu. Specifically, the input processing section 39 allows the screen display device 47 to display an applied tool input screen G shown in, for example, FIG. 2. The screen G includes a tool number selecting section Ga, a condition setting section Gb, and an applied tool selecting section Gc.

The tool number selecting section Ga has a tool number changing operation section Ga1 and a tool number display section Ga2. Every time the operator touches the tool number changing operation section Ga1 with his or her finger, the display of a tool number such as "t001" prepared in the menu is sequentially changed to that of the next tool number.

The condition setting section Gb has a material type changing operation section Gb1 and a material type display section Gb2. Every time the operator touches the material type changing operation section Gb1 with his or her finger, the name (or abbreviated name) of a material prepared in the menu to be displayed in the material type display section Gb2. The figure shows that "SUS" has been selected as a material. The condition setting section Gb also has a material board thickness changing operation section Gb3 and a material board thickness display section Gb4. Every time the operator touches the material board thickness changing operation section Gb3 with his or her finger, a material board thickness condition prepared in the menu to be displayed in the material board thickness display section Gb4. The figure shows that ">1.5 mm" has been selected as a material board thickness condition. The condition setting section Gb has a result display section Gb5 that shows a combination of the selected conditions of the material type and the material board thickness.

An applied tool selecting section Gc has a punch changing operation section Gc1, a die changing operation section Gc3, and compatibility number display sections Gc2, Gc4. Every time the operator touches the punch changing operation section Gc1 or die changing operation section Gc3 with his or her finger, the compatibility number displayed in the compatibility number display sections Gc2, Gc4 is sequentially changed.

In the applied tool input screen G, with the tool number, material type, material board thickness, and compatibility numbers of the punch $\mathbf{8}_1$ and die $\mathbf{8}_2$ selected, the operator provides a predetermined input for confirming the selection contents on the screen or via another input means. This allows the punch $\mathbf{8}_1$ and die $\mathbf{8}_2$ with that tool number to be registered in the storage section of the compatible tool registering means 38, shown in FIG. 1, so that the punch $\mathbf{8}_1$ and die $\mathbf{8}_2$ with the selected compatibility number are selected in the case of the selected material type and material board thickness.

The setup information generating means 48 compares the tool number in the processing schedule SH stored in the schedule storage means 44 with the tool numbers stored in the mounted tool information storage means 45 to generate setup information F3. In addition to performing the comparison of the tool numbers, the setup information generating means 48 checks the processing conditions such as board thickness and material quality contained in the processing schedule SH against the compatible tool registering means 38, and compares the obtained compatibility numbers of the punch $\mathbf{8}_1$ and die $\mathbf{8}_2$ with the compatibility numbers stored in the mounted tool information storage means 45. The setup information generating means 48 thus generates setup information F3, and the created setup information F3 is stored in the setup information storage means 49.

The setup information F3 generated indicates which punch $\mathbf{8}_1$ and die $\mathbf{8}_2$ need to be replaced before which unit schedule Sch or during which unit schedule Sch. The replacement of the punch $\mathbf{8}_1$ and die $\mathbf{8}_2$ shown in the present specification includes not only replacement with tools with a different tool number but also replacement with tools with the same tool number and a different compatibility number. Since the punch press 1, the object of the present embodiment, enables the replacement of the turrets 7, the setup information F3 also contains information on which turret 7 is to be replaced before which unit schedule Sch or during which unit schedule Sch. In this case, the setup information F3 also contains information on which tool 8 is placed in each tool supporting portion 7*a* of the turret 7.

The replacement as used in the present specification includes a process of only carrying the turret 7 out of the punch press 1 and a process of only carrying the turret 7 into the punch press 1. The internal tool magazine 5 need not always fill all the pockets 5*a* with the turrets 7, and an empty pocket 5*a* allows the required tools 8 to be introduced into the punch press 1 simply by carrying the turret 7 into the punch press 1.

The generated setup information F3 can be displayed on the screen of the screen display device 47 by processing by a schedule display generating section 75 of display information generating means 71. As shown in, for example, FIG. 6, the schedule display generating section 75 displays, in a schedule display 88, a plurality of display portions such as rows in each of which a schedule number and a file name for a processing program corresponding to that number. Selecting an arbitrary schedule display portion in the schedule display 88 (shaded portion in the figure has been selected) allows the display, in a setup display $\mathbf{8}_1$ adjacent to the schedule display 88, the display of turrets used for the schedule (column with "T" displayed in the heading row), the numbers of tool supporting portions 7*a* of these turrets 7 (column with "St" displayed in the heading row), the tool numbers mounted in these tool supporting portions 7*a*, and a tool display showing the sizes and shapes corresponding to these tool numbers. The setup display 81 also displays compatibility numbers indicating which of the punches $\mathbf{8}_1$ and dies $\mathbf{8}_2$ identified by the tool numbers are to be used. For the compatibility number, the punch $\mathbf{8}_1$ corresponds to the heading "upper tool", and the die $\mathbf{8}_2$ corresponds to the heading "lower tool", and the compatibility number is, for example, "1" or "2". The other display information generating functions of the display information generating means 71 will be described below in detail.

In the setup information generating device for the punch press configured as described above, in addition to performing the comparison of the tool numbers, the setup information generating means 48 checks the processing conditions such as board thickness and material quality contained in the processing schedule SH against the registered contents in the compatible tool registering means 38. The setup information generating means 48 then compares the obtained compatibility numbers of the punch and die with the compatibility numbers stored in the mounted tool information storage means 45 to generate setup information F3. This prevents the situation in which in spite of the need for setup, the setup does not take place, resulting in erroneous processing. Further, the following are registered in the compatible tool registering means 38 in accordance with inputs from the input means: the processing conditions such as the material quality and board thickness of the plate material and information on which of the plural types of punches $\mathbf{8}_1$ and dies $\mathbf{8}_2$ identified by the same tool number are compatible as a punch $\mathbf{8}_1$ and a die $\mathbf{8}_2$ which meet the processing conditions. This enables processing know-how or the like to be reflected by the registration in the compatible tool registering means 38, resulting in appropriate processing.

The compatible tool registering means 38 has the input processing section 39 to allow selections from the menu that allows the plurality of selection contents to be displayed for each of items of the processing conditions such as material quality and board thickness, and the compatibility numbers. This facilitates the inputting of the processing conditions and compatibility numbers. Further, some of the plural types of punches $\mathbf{8}_1$ and dies $\mathbf{8}_2$ identified by the same tool number and used for processing for the same shape and the same size have different clearances between the punch $\mathbf{8}_1$ and the die $\mathbf{8}_2$. This enables the generation of setup information for changing the clearance. Thus, where plate materials with different board thicknesses and different material qualities are to be processed, combinations of punches $\mathbf{8}_1$ and dies $\mathbf{8}_2$ having appropriate clearances can be set up. This enables high quality punching to be always achieved.

Figure 3:
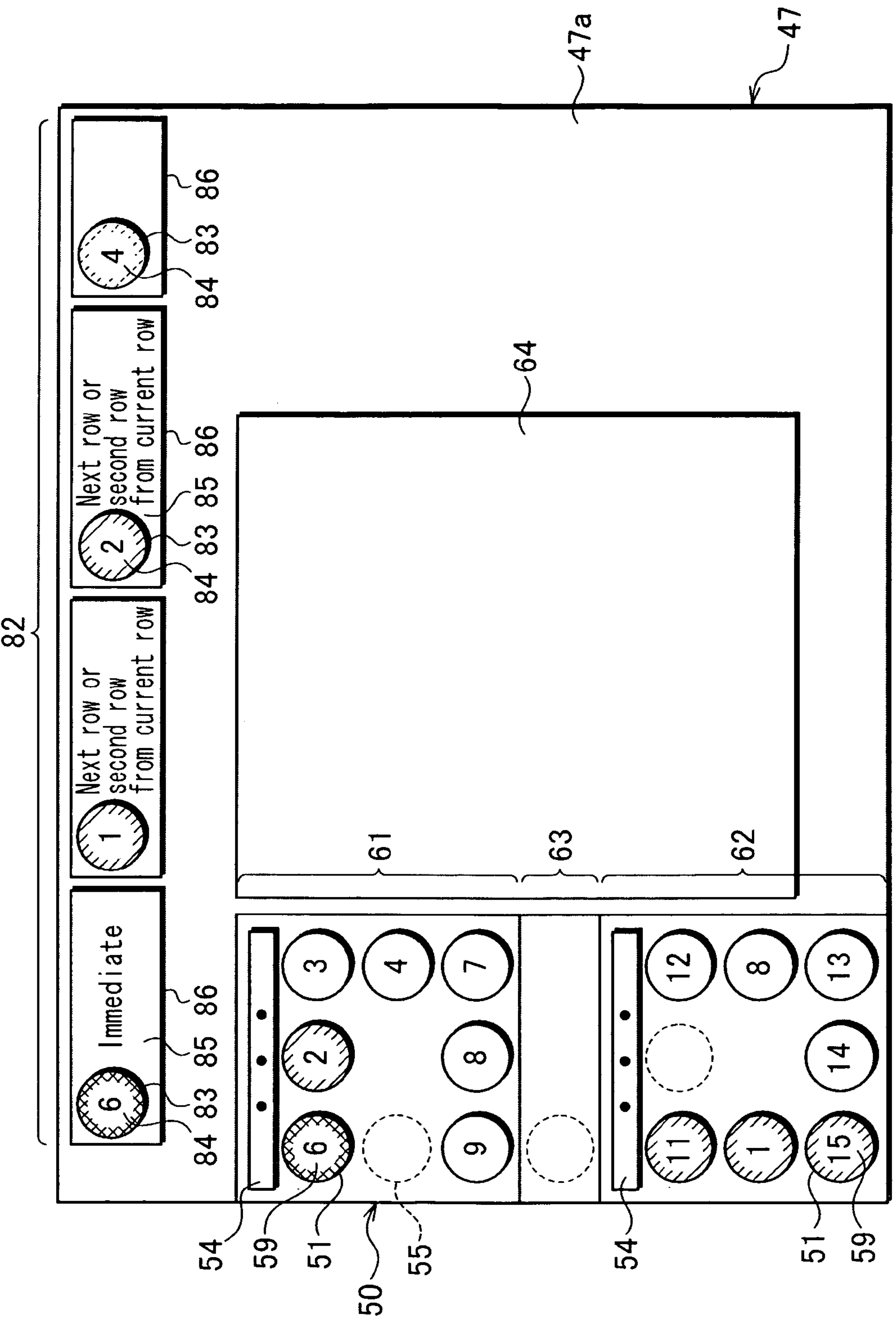
FIG. 3 is a diagram illustrating a screen example showing how a guide display and an installation status display are shown by the setup information generating device.
Figure 4:
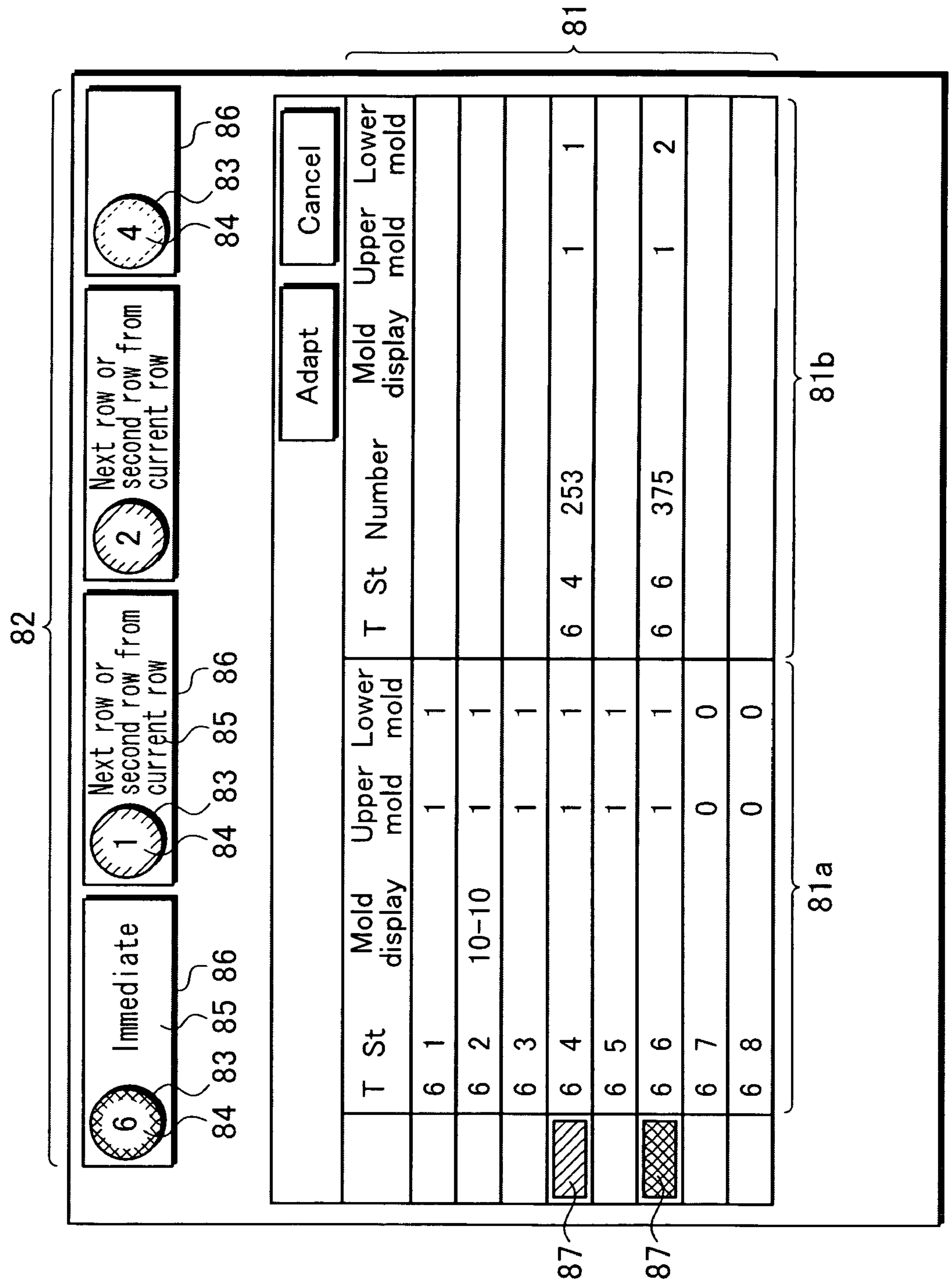
FIG. 4 is a diagram illustrating a screen example showing how the guide display and a setup information display are shown by the setup information generating device.
Figure 6:
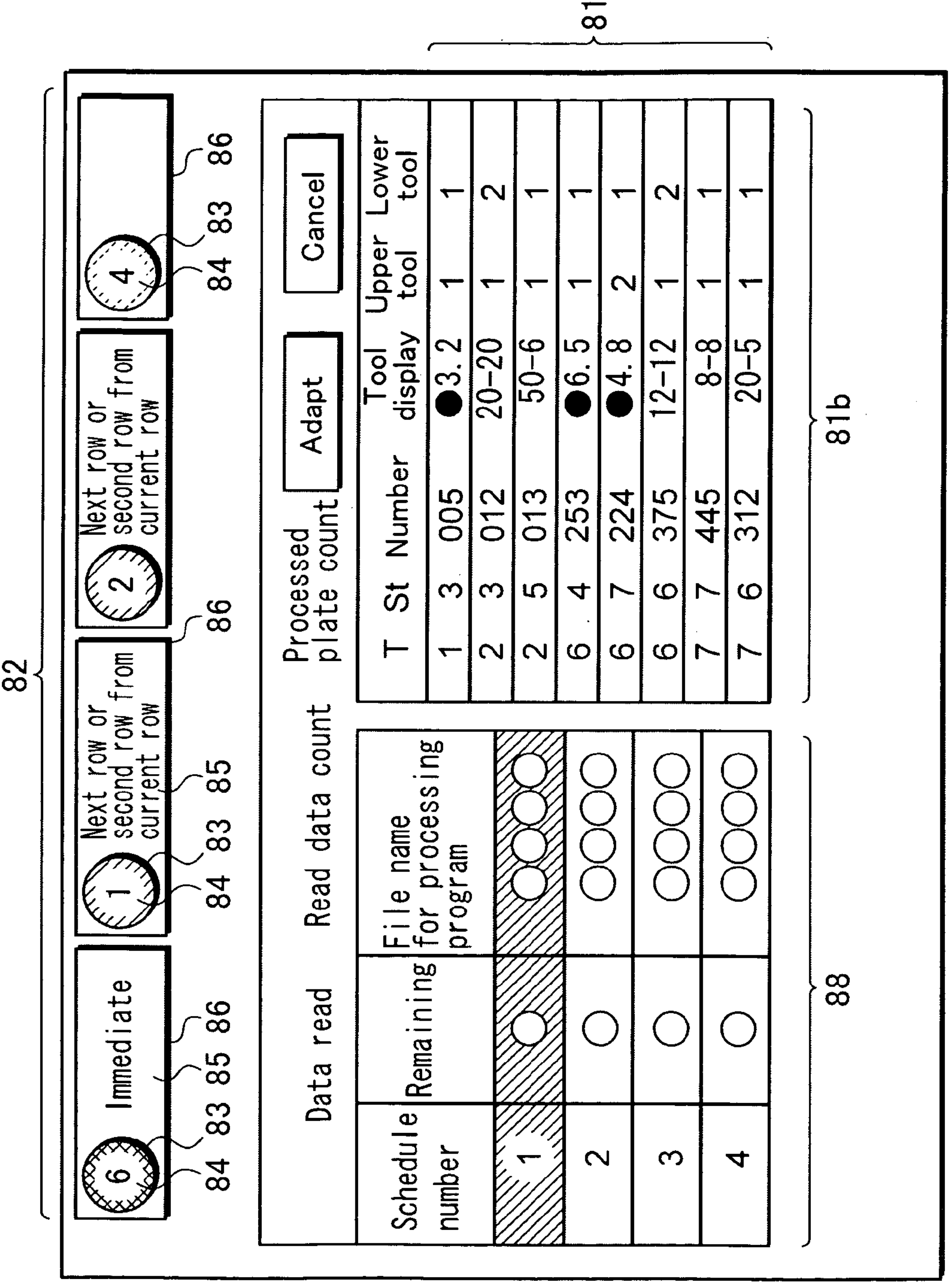
FIG. 6 is a diagram illustrating an example of a schedule display screen displayed by the setup information generating device.

Now, the display information generating means 71 will be described. The display information generating means 71 generates and displays information to be displayed in the information display section 47*a*, comprising the screen of the display device 47, in accordance with the storage contents of the setup information storage means 49 or the storage contents of the setup information storage means 49 and mounted tool information storage means 45. The display information generating section 71 then allows the information to be displayed in the information display section 47*a*, and as shown in FIGS. 3 and 4, the display information generating means 71 allows a setup information display 81, a guide display 82, and an installation status display 50 to be shown in the information display section 47*a*. The display information generating means 71 further allows the schedule display 88 to be shown in the information display section 47*a* as shown in FIG. 6. The displays 81, 82, 50, 88 are generated by a guide display generating section 72, a setup information display generating section 73, an installation status display generating section 74, and a schedule display generating section 75 which are provided in the display information generating means 71.

As shown in FIG. 3, the installation status display 50, shown in FIG. 1, shows a turret presence information display 51 as the arrangement of the pockets on the internal tool magazine 5 and external tool magazine 6 in a pseudo manner using circular marks. In this case, display areas 61, 62 are provided for the internal tool magazine 5 and external tool magazine 6, respectively, and a display area 63 is provided for the tool changer 3, and the turret presence information display 51 is provided for each of the display areas 61 to 63. In the installation status display 50, a pocket corresponding display position at which the turret presence information display 51 is shown is specified for each of the pockets 5*a*, 6*a* on the internal tool magazine 5 and external tool magazine 6. The pocket corresponding display positions are arranged in accordance with the arrangement of the pockets on the internal tool magazine 5 and external tool magazine 6 in a pseudo manner.

In the installation status display 50, the turret presence information display 51 is shown at those of the pocket corresponding display positions on the internal tool magazine 5 and external tool magazine 6 where the turrets 7 are installed. The turret presence information display 51 is not shown at those of the pocket corresponding display positions where no turrets 7 are installed. Those of the pocket corresponding display positions where no turrets 7 are installed may be simply displayed against the same background as that of the peripheral parts or provided with position displays 55 indicative of the pocket corresponding display positions. In the present embodiment, circular areas shown by broken lines in the figure are shown with an unnoticeable color that is similar to the background color; the circular areas correspond to the position displays 55 indicative of the pocket corresponding display positions.

The each turret presence information display 51 is a circular mark as described above, and an identification number display 59 for the turret 7 is provided in the circular mark. The identification number is a string such as “T01” comprising a turret number preceded by an initial letter “T” indicating that this is a turret number. However, in the identification number display 59 in the turret presence information display 51, the head letter “T” and the upper digit “0” are omitted, with only the numeric part such as “1” displayed. This is because the identification number display 59 in the turret presence information display 51 obviously indicates a turret number and because the identification number free from unwanted elements such as the initial letter is easier to see.

The installation status display 50 is shown in a part of the screen, while a turret content display 64 and the next guide display 82 are shown in the remaining part of the screen; the turret content display 64 shows the contents of a specified turret presence information display 51.

The guide display 82 prompts the operator to perform an operation required to switch a part of the screen to display the setup information display 81. For the turrets 7 that need to be set up, the guide display 82 shows marks 83 indicative of these turrets 7. The mark 83 is shown as, for example, a circle inside which the identification number display 84 for the turret 7 is provided. As is the case with the identification number display 59 in the turret presence information display 51, the initial letter “T” and upper digit “0” of the turret number are omitted from the identification number display 84, with only the numerical part such as “1”, displayed.

Figure 2:
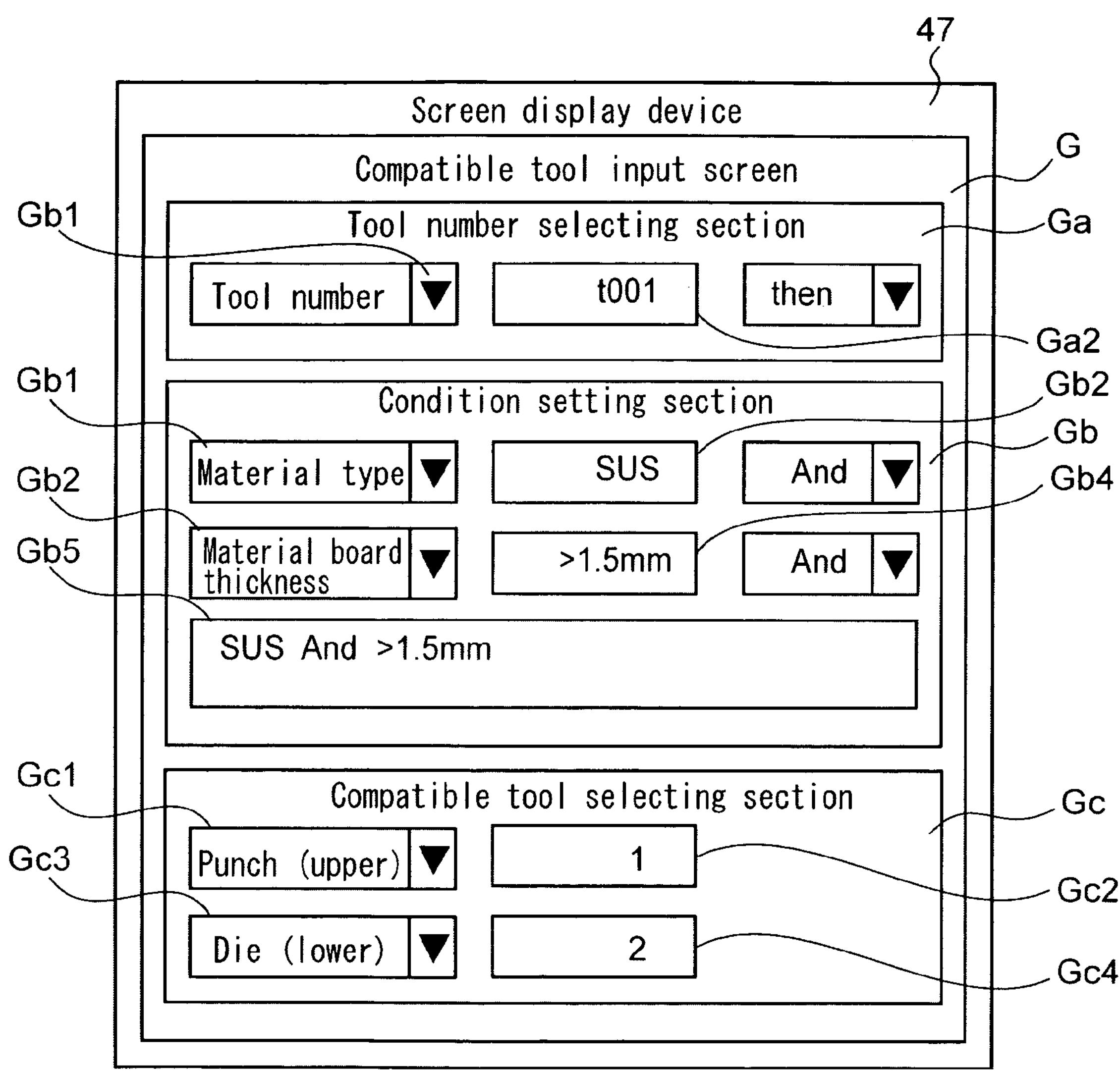
FIG. 2 is a diagram illustrating an example of a compatible tool input screen.

In the guide display 82, the marks 83 indicative of the turrets 7 are classified for display according to the urgency level of setup in the setup information. In FIG. 2, hatching is used to show a difference in color. However, for the classification display, the color of the marks 83 is varied depending on the urgency level.

Here, the urgency is classified into three levels. Red is used to show turrets 7 with the highest urgency level, that is, turrets 7 which are in operation or which are required for a processing program for a started unit schedule Sch. In FIG. 3, the cross hatching indicates red. Yellow is used to show turrets 7 with the second highest urgency level, for example, turrets 7 which are required for the processing program in the next row or the second row from the current row (that is, the processing program for the next unit schedule or the second unit schedule from the current unit schedule) and which may currently be changed. In FIG. 3, the one-side inclined hatching indicates yellow. Blue is used to show turrets 7 with the lowest urgency level, for example, turrets 7 which will need to be changed in order to achieve the entire processing schedule S but which cannot currently be changed. In FIG. 3, the dotted hatching indicates blue.

In addition to the distinction by color, a message display 85 containing a text indicating the urgency level is shown in according with the urgency level. The circular mark 83 and the message display 85 are enclosed by an enclosure display 86 such as a rectangle for each mark 83. The message display 85 is, for example, “execute immediately” or “execute the next row or the second row from the current row”.

The number of the marks 83 displayed on the screen is up to a predetermined maximum number (in the example shown in the drawings, four). Even if more than the predetermined maximum number of turrets 7 need to be set up, up to the predetermined maximum number of marks 83 are shown as the guide display 82. Turrets 7 which need to be set up and which correspond to an excess of the predetermined maximum number are displayed as the number of turrets 7 that need to be set up decreases as a result of execution of setup. The execution of setup is recognized by the display information generating means 71 by monitoring the storage contents of the mounted tool information storage means 45 for a change.

The same colors that indicate the urgency levels in the guide display 82 are used for the turret presence information display 51 for the corresponding turret 7 in the installation status display 50. This color display is processed by the installation status display generating section 74.

The setup information display 81 and the installation status display 50 are selectively displayed on the screen of display device 47. When an arbitrary turret presence information display 51 is specified which is shown in the installation status display 50, the setup information display generating section 73 in FIG. 1 displays, on the screen, the detailed contents of the turret 7 corresponding to the specified turret presence information display 51. The turret presence information display 51 is specified by touching, with the finger, the area on the screen in which that turret presence information display 51 is shown. This allows the selection to be input via the touch panel (not shown in the drawings), covering the surface of the screen.

FIG. 4 shows a specific example of the setup information display 81. The setup information display 81 in this example is a table showing information on the tool supporting portions 7*a* of the turret 7 in the respective rows. The table has a left column 81*a* and a right column 81*b*. The left column 81*a* shows information on the currently installed tools $\mathbf{8}_1$ and the right column 81*b* shows information on the tools 8 that need to be set up. The left column 81*a* and the right column 81*b* show, in each row, a station number “1” to “8” identifying the tool supporting portion 7*a*, tool information on the size or the like of the tool $\mathbf{8}_1$ and information on the combination of an upper tool and a lower tool. The upper tool and lower tool combination information identifies the types of an upper tool and a lower tool which are shown with the same tool number, for example, in order to vary the clearance as described above; plural types of upper tools and plural types of lower tools are provided. For example, the types are shown by the number “1” and “2”. The setup information display 81 also shows the identification number (in this case, “6”) of the turret 7 in all the rows.

The setup information display 81 provides an tool setup requirement display 87 at, for example, the head of the row of an tool 8 that needs to be set up; the tool setup requirement display 87 indicates that this tool 8 needs to be set up. The tool setup requirement display 87 comprises, for example, the letters “setup” shown in an enclosure display. The tool setup requirement display 87 has its color varied in accordance with the urgency level similarly to the marks 83 in the guide display 82.

Figure 5:
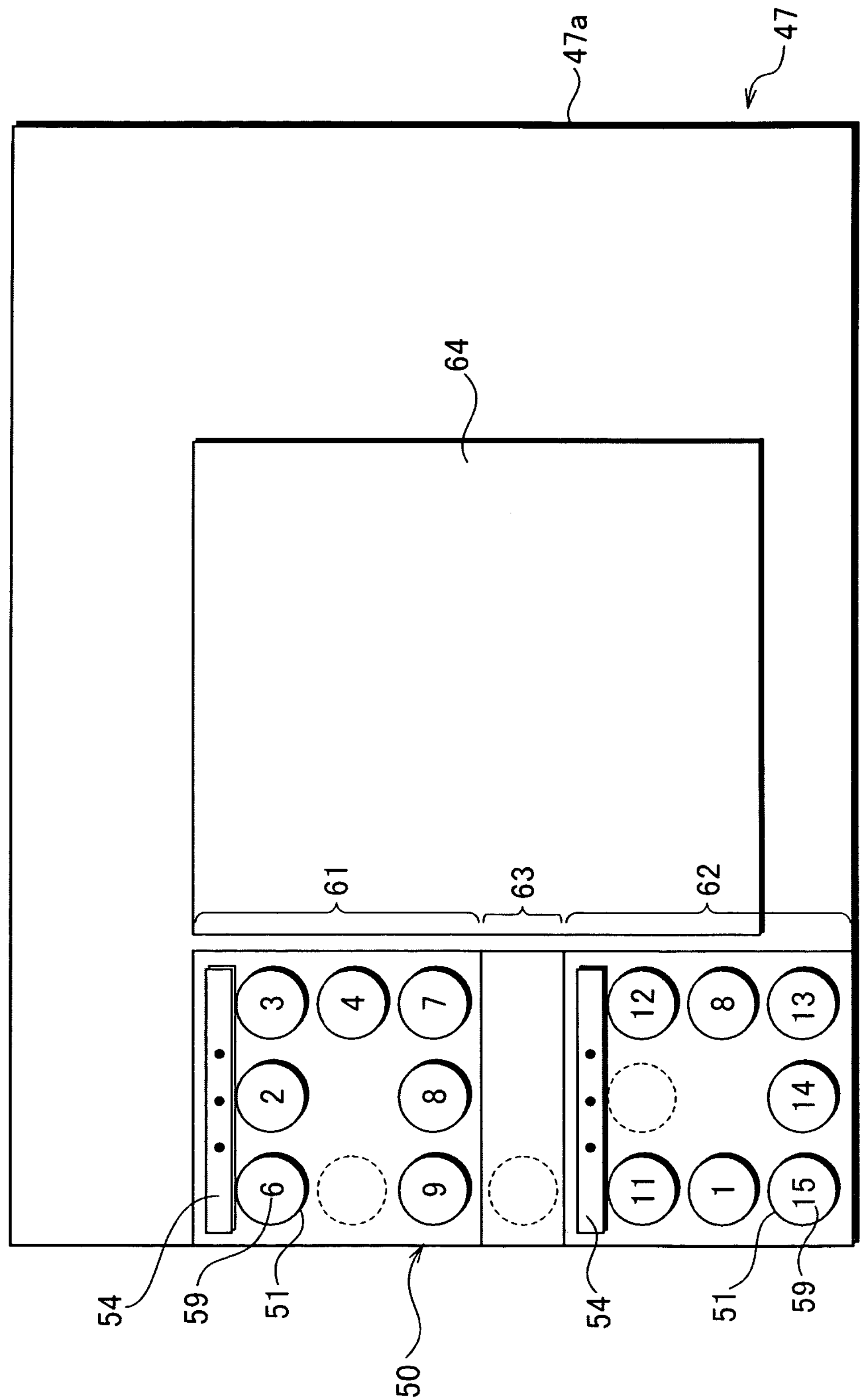
FIG. 5 is a diagram illustrating an example of a screen displayed by the setup information generating device where no setup needs to be executed.

As described above, the display information generating means 71 generates display information in accordance with the setup information, and the installation status display 50 and the guide display 82 are then shown on the screen of the display device 47 as shown in FIG. 3. The installation status display 50 shows the current installation status of the turrets 7 in the processing machine 1 in a pseudo manner. For the turrets 7 that need to be set up, the guide display 82 shows the circular marks 83 indicative of these turrets 7 and shows the identification number displays 84 of the turrets 7 in the respective marks 83. The marks 83 are classified according to the urgency level of setup, and the classified urgency levels are shown with the different colors, "red", "yellow", and "blue". Where no setup currently needs to be executed, the guide display 82 is not displayed. FIG. 5 shows a screen example in which no setup needs to be executed. The turrets 7 that need to be set up are thus shown in the guide display 82 and classified according to the urgency levels. This makes it possible to easily determine which turret 7 currently needs to be set up and at what time that turret 7 is to be set up.

The same colors that indicate the urgency levels in the guide display 82 are used for the turret presence information displays 51 for the corresponding turrets 7 in the installation status display 50. Consequently, the installation status display 50, showing the actual tool installation status, allows the easy determination of the pocket number of the turret 7 that needs to be set up.

Touching the turret presence information display 51 in the installation status display 50 with the finger allows the setup information display generating section 73 to execute an appropriate process to cause the setup information display 81 to appear on the screen as shown in FIG. 4. The setup information includes detailed contents such as the types and sizes of the tools. Accordingly, information on all the turrets 7 listed on the screen is complicated and difficult to understand. However, the present embodiment displays the guide display 82 so that the required setup information display 81 can be displayed by viewing the guide display 82 and touching the corresponding part of the installation status display 50 with the finger as described above. This enables extra displays to be minimized, allowing the required setup information to be easily displayed. Further, the setup information display 81 includes the tool setup requirement display 87 and the display of changed contents to indicate which tool 8 in the turret 7 needs to set up. The operator can thus view these displays to easily perform a setup operation.

Up to the predetermined maximum number of marks 83 indicative of the turrets 7 are displayed in the guide display 82. This makes the display contents clearer and easier to understand. Turret type tools 7 which need to be set up and which correspond to an excess of the predetermined maximum number are displayed as the number of turrets 7 that need to be set up decreases as a result of execution of setup. This allows the guide display 82 to provide all the required displays. Further, the information display section 47*a* of the display device 47 is covered with the touch panel. Consequently, simply touching the appropriate display area with the finger enables the installation status display 50 to be switched to the setup information display 81. The display contents can thus be switched easily and quickly.

Figure 10:
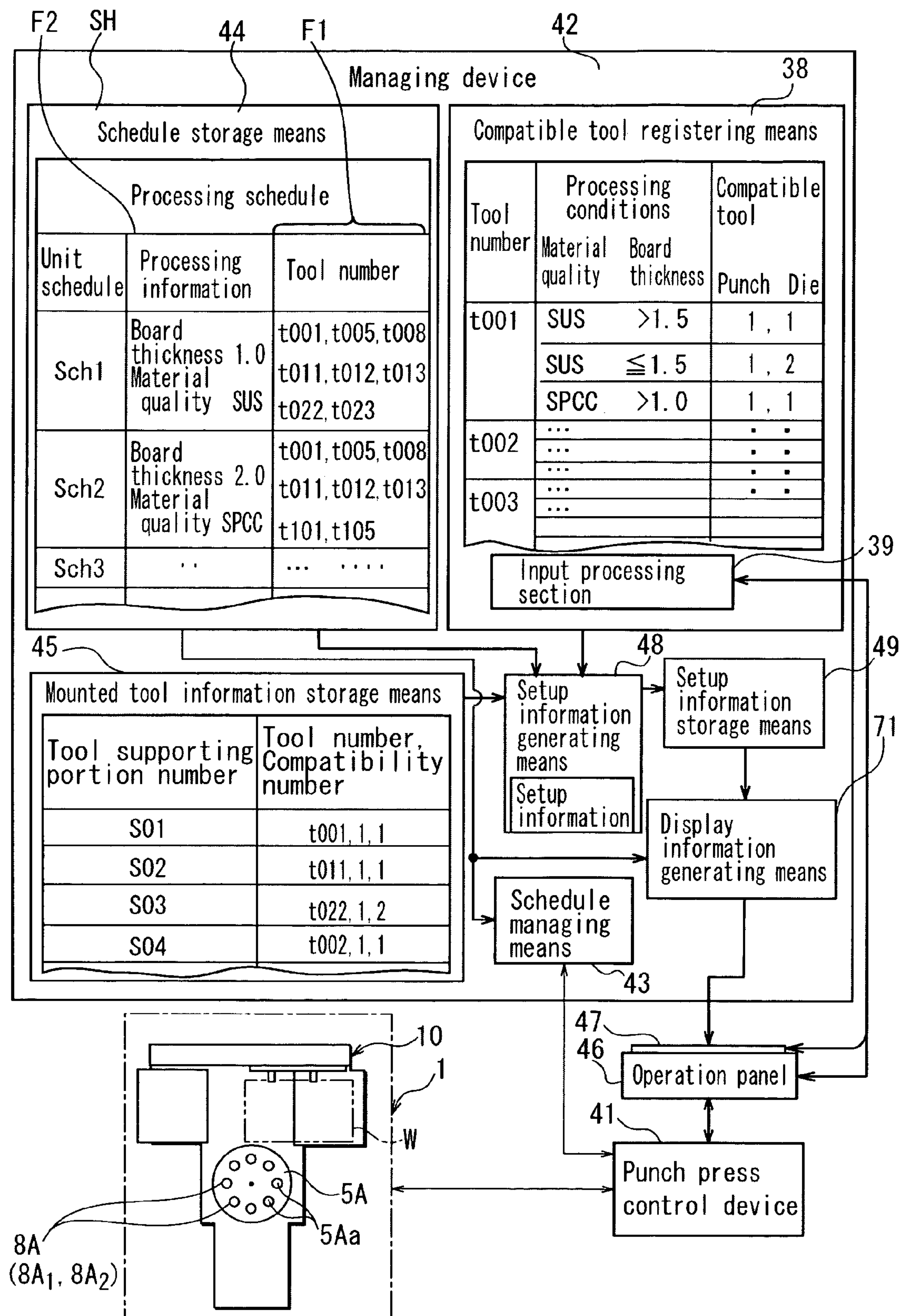
FIG. 10 is a block diagram showing the conceptual configuration of a setup information generating device according to another embodiment of the present invention.

FIG. 10 shows another embodiment of the present invention. The present embodiment is applied to the punch press 1 comprising a turret punch press that employs common turrets with their positions fixed. In this case, a vertical pair of turrets 5A corresponds to the tool magazine 5 in the above embodiment. Individual tools 8A are installed in respective pockets 5Aa on each tool magazine 5A. The individual tool 8A is a general term for a punch 8$A_1$ and a die 8$A_2$. The punches 8$A_1$ are mounted on the upper turret 5A. The dies 8$A_2$ are mounted on the lower turret 5A.

In this case, the processing schedule SH in the schedule storage means 44 contains no information on the turret numbers for each unit schedule, shown in FIG. 1. The mounted tool information storage means 45 stores the tool numbers and compatibility numbers of the mounted tools 8A for each tool supporting portion 5Aa of the turret 5A. The other arrangements are similar to those in the first embodiment, shown in FIG. 1.

Thus, even where the punch press 1 is a turret punch press in which turrets with their positions fixed are installed, the setup information generating means 48, in addition to performing the comparison of the tool numbers, checks the processing conditions such as board thickness and material quality contained in the processing schedule SH against the contents registered in the compatible tool registering means 38. The setup information generating means 48 then compares the obtained compatibility numbers of the punch 8$A_1$ and die 8$A_2$ with the compatibility numbers stored in the mounted tool information storage means 45 to generate setup information F3. This prevents the situation in which in spite of the need for setup, the setup does not take place, resulting in erroneous processing. Further, the following are registered in the compatible tool registering means 38 in accordance with inputs from the operation panel 46: the processing conditions such as the material quality and board thickness of the plate material and information on which of the plural types of punches 8$_1$ and dies 8$_2$ identified by the same tool number are compatible as a punch 8$A_1$ and a die 8$A_2$ which meet the processing conditions. This enables processing know-how or the like to be reflected by the registration in the compatible tool registering means 38, resulting in appropriate processing.

While the present invention has been described with respect to preferred embodiments thereof, it will be apparent to those skilled in the art that the disclosed invention may be modified in numerous ways and may assume many embodiments other than those specifically set out and described above. Accordingly, it is intented by the appended claims to cover all modifications of the present invention that fall within the true spirit and scope of the invention.

The invention claimed is:

1. A setup information generating device for a punch press in which a plurality of punches and a plurality of dies can be mounted with replacement punches and dies prepared, and for which for any of the mounted or prepared punches and dies, replacement among plural types of punches or dies is possible for at least either the punches or dies identified by the same tool number and used for processing for the same shape and the same size, the setup information generating device generating setup information on replacement of the mounted punches and dies, the setup information generating device being characterized by comprising processing schedule storage means that stores a processing schedule containing information on tool numbers of the punch and die required for processing, mounted tool information storage means that stores the tool numbers of the punches and dies mounted on the punch press, setup information generating means for comparing the tool numbers stored in the processing schedule storage means with the tool numbers stored in the mounted tool information storage means to generate the setup information, and compatible tool registering means in which processing conditions including the material quality and board thickness of a plate material to be processed and information on which of the plural types of punches and dies identified by the same tool number are compatible as a punch and a die which meet the processing conditions are registered in accordance with inputs from input means, and in that the mounted tool information storage means stores, in addition to the tool numbers, compatibility numbers that identify the plural types of punches and dies identified by the same tool number, and the processing schedule contains the processing conditions, and in that in addition to performing the comparison of the tool numbers, the setup information generating means checks the processing conditions contained in the processing schedule against the compatible tool registering means, and compares the obtained compatibility numbers of the compatible punch and die with the compatibility numbers stored in the mounted tool information storage means to generate the setup information.

2. A setup information generating device for a punch press according to claim 1, characterized in that the compatible tool registering means has a menu that allows a plurality of selection contents to be displayed for each of items of the processing conditions including material quality and board thickness and the compatibility numbers, and has a selection input function for allowing selections from the menu.

3. A setup information generating device for a punch press according to claim 1, characterized in that the plural types of punches or dies identified by the same tool number and used for processing for the same shape and the same size have different clearances between the punch and the die.

4. A computer-implemented setup information generating method for a punch press in which a plurality of punches and a plurality of dies can be mounted with replacement punches and dies prepared and for which for any of the mounted or prepared punches and dies, replacement among plural types of punches or dies is possible for at least either the punches or dies identified by the same tool number and used for processing for the same shape and the same size, the setup information generating method generating setup information on replacement of the mounted punches and dies, the setup information generating method being characterized by comprising:

storing a processing schedule containing information on tool numbers of the punch and die required for processing, in processing schedule storage means;

storing the tool numbers of the punches and dies mounted on the punch press, in mounted tool information storage means;

comparing the tool numbers stored in the processing schedule storage means with the tool numbers stored in the mounted tool information storage means to generate the setup information;

registering processing conditions including the quality and board thickness of a plate material to be processed and information on which of the plural types of punches and dies identified by the same tool number are compatible as a punch and a die which meet the processing conditions, in compatible tool registering means in accordance with inputs from input means; and in addition to performing the comparison of the tool numbers stored in both the storage means, checking the processing conditions contained in the processing schedule against the compatible tool registering means and comparing the compatibility numbers of the compatible punch and die with the compatibility numbers stored in the mounted tool information storage means to generate the setup information.

* * * * *